US012269026B2

(12) United States Patent
Grover et al.

(10) Patent No.: US 12,269,026 B2
(45) **Date of Patent: *Apr. 8, 2025**

(54) SYSTEM AND APPARATUS FOR REACTIONS INCLUDING A LIQUID TRANSFER DEVICE WITH AN ASYMMETRICAL CROSS-SECTION

(71) Applicant: ABBOTT DIAGNOSTICS SCARBOROUGH, INC., Scarborough, ME (US)

(72) Inventors: Simon Roderick Grover, Cambridge (GB); Paul Graham Wilkins, Cambridge (GB); Nick David Rollings, St. Albans (GB); Peter Laurence Mayne, London (GB); Wai Ting Chan, Cambridge (GB); Natalie Frances Scott, Cambridge (GB); Olivier Fernand Flick, Cambridge (GB); Henry Charles Innes, Princeton, NJ (US); Martyn Gray Darnbrough Beedham, Cambridge (GB); Nicholas David Long, Harrold (GB); Richard John Hammond, Foxton (GB)

(73) Assignee: ABBOTT DIAGNOSTICS SCARBOROUGH, INC., Scarborough, ME (US)

( * ) Notice: Subject to any disclaimer, the term of this patent is extended or adjusted under 35 U.S.C. 154(b) by 501 days.

This patent is subject to a terminal disclaimer.

(21) Appl. No.: 17/238,841

(22) Filed: Apr. 23, 2021

(65) Prior Publication Data

US 2021/0316297 A1 Oct. 14, 2021

Related U.S. Application Data

(60) Continuation of application No. 16/057,209, filed on Aug. 7, 2018, now Pat. No. 11,033,894, which is a (Continued)

(51) Int. Cl.
*B01L 3/00* (2006.01)
*B01L 3/02* (2006.01)
*A61J 1/20* (2006.01)

(52) U.S. Cl.
CPC ............ *B01L 3/0217* (2013.01); *B01L 3/502* (2013.01); *A61J 1/2096* (2013.01);

(Continued)

(58) Field of Classification Search
CPC .. B01L 3/0217; B01L 3/502; B01L 2200/025; B01L 2200/026; B01L 2200/16;

(Continued)

(56) References Cited

U.S. PATENT DOCUMENTS 726,629 A 4/1903 Brown
3,389,835 A 6/1968 Marbach et al.

(Continued)

FOREIGN PATENT DOCUMENTS

EP 0297441 1/1989
EP 1385006 1/2004

(Continued)

OTHER PUBLICATIONS

Allshire, "RNAi and Heterochromatin—a Hushed-Up Affair," Science, 297:1818-1819, 2002.

(Continued)

*Primary Examiner* — Arlen Soderquist
(74) *Attorney, Agent, or Firm* — Casimir Jones, S.C.; Thomas J. Lyneis; Thomas A. Isenbarger

(57) ABSTRACT

This disclosure provides systems, apparatuses, and methods for liquid transfer and performing reactions. In one aspect, a system includes a liquid transfer device having a housing having a pipette tip and a plunger assembly; and a reaction chamber, wherein the housing of the liquid transfer device is configured to sealably engage with the reaction chamber. In (Continued)

another aspect, a liquid transfer device including a housing having a pipette tip; and a plunger assembly disposed within the housing and the pipette tip, wherein a portion of the plunger assembly is configured to engage a fluid reservoir such that the plunger assembly remains stationary relative to the fluid reservoir and the housing moves relative to the plunger assembly.

19 Claims, 12 Drawing Sheets

Related U.S. Application Data division of application No. 15/141,190, filed on Apr. 28, 2016, now Pat. No. 10,040,061, which is a continuation of application No. 13/242,999, filed on Sep. 23, 2011, now Pat. No. 9,352,312.

(52) U.S. Cl.
CPC ... *B01L 2200/025* (2013.01); *B01L 2200/026* (2013.01); *B01L 2200/16* (2013.01); *B01L 2300/025* (2013.01); *B01L 2400/0478* (2013.01); *Y10T 436/2575* (2015.01)

(58) Field of Classification Search
CPC ....... B01L 2300/025; B01L 2400/0478; Y10T 436/2575; A61J 1/2096
USPC ................ 422/501, 509–512, 514, 516, 519, 422/521–522, 524–525; 436/180; 73/863.32, 864.01, 864.11, 864.13–864.14
See application file for complete search history.

(56) References Cited

U.S. PATENT DOCUMENTS 3,430,628 A * 3/1969 Wiggins ........... A61B 5/150305 604/173
3,444,742 A * 5/1969 Ellis .......................... B01L 9/54 422/922
3,572,552 A * 3/1971 Guinn ..................... G01F 11/08 73/864.11
3,653,839 A 4/1972 Luks et al.
3,827,305 A 8/1974 Gilson et al.
3,855,868 A * 12/1974 Sudvaniemi .......... B01L 3/0224 73/864.18
4,047,438 A * 9/1977 Sekine .................... B01L 3/021 422/922
4,058,370 A * 11/1977 Suovaniemi ......... G01N 21/253 422/922
4,153,057 A 5/1979 Kobel
4,258,761 A * 3/1981 Bennett, Jr. ........... B01L 3/0217 422/923
4,466,426 A 8/1984 Blackman
4,498,510 A * 2/1985 Minshew, Jr. ........ B01L 3/0217 73/864.18
4,734,261 A * 3/1988 Koizumi ............... B01L 3/0217 73/864.18
4,879,242 A * 11/1989 Tsukioka ................ B01L 13/00 422/63
4,921,618 A 5/1990 Hamlin
5,027,855 A 7/1991 Jaggi
5,210,015 A 5/1993 Gelfand et al.
5,270,184 A 12/1993 Walker et al.
5,343,909 A * 9/1994 Goodman ............... B01L 3/021 422/922
5,352,413 A * 10/1994 Kratzer ............. G01N 33/4905 422/520
5,354,668 A 10/1994 Auerbach
5,397,698 A 3/1995 Goodman et al.
5,422,252 A 6/1995 Walker et al.
5,455,166 A 10/1995 Walker
5,470,723 A 11/1995 Walker et al.
5,487,972 A 1/1996 Gelfand et al.
5,556,751 A 9/1996 Stefano
5,591,609 A 1/1997 Auerbach
5,614,389 A 3/1997 Auerbach
5,638,828 A 6/1997 Lauks
5,681,705 A 10/1997 Schram et al.
5,712,124 A 1/1998 Walker
5,733,733 A 3/1998 Auerbach
5,744,311 A 4/1998 Frasier et al.
5,747,246 A 5/1998 Pannetier et al.
5,747,255 A 5/1998 Brenner
5,804,375 A 9/1998 Gelfand et al.
5,834,202 A 11/1998 Auerbach
5,846,717 A 12/1998 Brow et al.
5,916,779 A 6/1999 Pearson et al.
5,928,869 A 7/1999 Nadeau et al.
5,942,391 A 8/1999 Zhang et al.
5,985,557 A 11/1999 Prudent et al.
6,033,881 A 3/2000 Himmler et al.
6,063,604 A 5/2000 Wick et al.
6,087,133 A 7/2000 Dattagupta et al.
6,090,552 A 7/2000 Nazarenko et al.
6,110,677 A 8/2000 Western et al.
6,130,038 A 10/2000 Becker et al.
6,144,455 A 11/2000 Tuunanen et al.
6,191,267 B1 2/2001 Kong et al.
6,214,587 B1 4/2001 Dattagupta et al.
6,241,689 B1 6/2001 Chard et al.
6,251,600 B1 6/2001 Winger et al.
6,261,768 B1 7/2001 Todd et al.
6,294,337 B1 9/2001 Hayashizaki
6,316,200 B1 11/2001 Nadeau et al.
6,348,314 B1 2/2002 Prudent et al.
6,350,580 B1 2/2002 Sorge
6,372,434 B1 4/2002 Weissman et al.
6,632,611 B2 10/2003 Su et al.
6,656,680 B2 12/2003 Nadeau et al.
6,692,917 B2 2/2004 Neri et al.
6,743,582 B2 6/2004 Nadea et al.
6,852,986 B1 2/2005 Lee et al.
6,861,222 B2 3/2005 Ward et al.
6,884,586 B2 4/2005 Van Ness et al.
6,893,819 B1 5/2005 Sorge
6,958,217 B2 10/2005 Pedersen
7,074,600 B2 7/2006 Dean et al.
7,109,495 B2 9/2006 Lee et al.
7,112,423 B2 9/2006 Van Ness et al.
RE39,885 E 10/2007 Nadeau et al.
7,276,597 B2 10/2007 Sorge
7,309,573 B2 12/2007 Sorge
7,373,253 B2 5/2008 Eyre
7,628,781 B2 12/2009 Roy et al.
7,888,108 B2 2/2011 Woudenberg et al.
9,352,312 B2 * 5/2016 Grover .................. B01L 3/0217
10,040,061 B2 * 8/2018 Grover .................... B01L 3/502
11,033,894 B2 * 6/2021 Grover .................... B01L 3/502
11,185,864 B2 * 11/2021 Haworth ............... B01L 3/0217
2002/0042059 A1 4/2002 Makarov et al.
2002/0086440 A1 * 7/2002 Lehtinen ............... B01L 3/0217 436/180
2002/0150919 A1 10/2002 Weismann et al.
2002/0187079 A1 * 12/2002 Ringleben ............... B01L 3/021 422/562
2003/0082590 A1 5/2003 Van Ness
2003/0138800 A1 7/2003 Van Ness et al.
2003/0165911 A1 9/2003 Van Ness et al.
2004/0058378 A1 3/2004 Kong et al.
2004/0146433 A1 * 7/2004 Massaro ................. B01L 3/022 422/63
2004/0179976 A1 9/2004 Chang
2004/0208793 A1 * 10/2004 Jarvimaki ............. B01L 3/0217 422/500
2005/0009050 A1 1/2005 Nadeau et al.
2005/0042601 A1 2/2005 Wolfe
2005/0074362 A1 4/2005 Lappe et al.
2005/0106750 A1 5/2005 Tung et al.
2005/0112639 A1 5/2005 Wang et al.
2005/0131313 A1 6/2005 Mikulka et al.

(56) References Cited

U.S. PATENT DOCUMENTS

| | | | | |
|---|---|---|---|---|
| 2005/0147973 | A1 | 7/2005 | Knott | |
| 2005/0164207 | A1 | 7/2005 | Shapero | |
| 2005/0202490 | A1 | 9/2005 | Makarov et al. | |
| 2005/0233332 | A1 | 10/2005 | Collis | |
| 2005/0266417 | A1 | 12/2005 | Barany et al. | |
| 2006/0154286 | A1 | 7/2006 | Kong et al. | |
| 2006/0228259 | A1 | 10/2006 | Samsoondar | |
| 2007/0020639 | A1 | 1/2007 | Shapero | |
| 2007/0031857 | A1 | 2/2007 | Makarov et al. | |
| 2007/0048193 | A1 * | 3/2007 | Wilmer | B01L 3/0275 422/506 |
| 2007/0092402 | A1 | 4/2007 | Wu et al. | |
| 2009/0017453 | A1 | 1/2009 | Maples et al. | |
| 2010/0024575 | A1 * | 2/2010 | Woodside | B01L 9/543 73/864.01 |

FOREIGN PATENT DOCUMENTS

| | | | | |
|---|---|---|---|---|
| EP | 2139442 B1 | | 1/2010 | |
| EP | 2302029 | | 3/2011 | |
| EP | 2606872 | | 6/2013 | |
| JP | H0690993 | | 4/1994 | |
| JP | 08117618 A | * | 5/1996 | B01L 3/0217 |
| JP | 2011182728 | | 9/2011 | |
| WO | WO 98/039485 | | 9/1998 | |
| WO | WO 99/07409 | | 2/1999 | |
| WO | WO 99/32619 | | 7/1999 | |
| WO | WO 00/01846 | | 1/2000 | |
| WO | WO 00/28084 | | 5/2000 | |
| WO | WO 00/44895 | | 8/2000 | |
| WO | WO 00/44914 | | 8/2000 | |
| WO | WO 01/29058 | | 4/2001 | |
| WO | WO 01/36646 | | 5/2001 | |
| WO | WO 03/008622 | | 1/2003 | |
| WO | WO 03/008624 | | 1/2003 | |
| WO | WO 03/008642 | | 1/2003 | |
| WO | WO 03/066802 | | 8/2003 | |
| WO | WO 03/072805 | | 9/2003 | |
| WO | WO 03/080645 | | 10/2003 | |
| WO | WO 04/022701 | | 3/2004 | |
| WO | WO 04/067726 | | 8/2004 | |
| WO | WO 04/067764 | | 8/2004 | |
| WO | WO 04/081183 | | 9/2004 | |
| WO | WO 05/026329 | | 3/2005 | |
| WO | WO 05/118853 | | 12/2005 | |
| WO | WO 2008/006503 | | 1/2008 | |
| WO | WO 2008/129550 A2 | | 10/2008 | |
| WO | WO 2010/141632 | | 12/2010 | |
| WO | WO 2010/141632 A2 | | 12/2010 | |
| WO | WO 2011/073174 | | 6/2011 | |
| WO | WO 13/041713 | | 3/2013 | |

OTHER PUBLICATIONS

Bass, "The short answer," Nature, 411:428-429, 2001.
Baulcombe, "An RNA Microcosm," Science, 297:2002-2003, 2002.
Buck et al., Research Report, "Design Strategies and Performance of Custom DNA Sequencing Primers," BioTechniques, 27:528-536, 1999.
Cai, "An Inexpensive and Simple Nucleic Acid Dipstick for Rapid Pathogen Detection," LAUR #05-9067 of Los Alamos National Laboratory, Aug. 22, 2006.
Church and Kieffer-Higgins, "Multiplex DNA Sequencing," Science, 240(4849):185-188, 1988.
Corstjens, et al., "Use of Up-Converting Phosphor Reporters in Lateral-Flow Assays to Detect Specific Nucleic Acid sequences: A Rapid, Sensitive DNA Test to Identify Human Papillomavirus Type 16 Infection," Clinical Chemistry, 47(10):1885-1893, 2001.
Crain and McCloskey, "Applications of mass spectrometry to the characterization of oligonucleotides and nucleic acids," A Current Opinion in Biotechnology, 9:25-34, 1998.
Dean et al., "Comprehensive human genome amplification using multiple displacement amplification," Proc. Natl. Acad. Sci. USA, 99(8):5261-66, 2002.
Demidov, "Rolling-circle amplification in DNA diagnostics: the power of simplicity," Expert Rev. Mol. Diagn., 2(6):89-95, 2002.
Elbashir et al., "Duplexes of 21-nucleotide RNAs mediate RNA interference in cultured mammalian cells," Nature, 411:494-498, 2001.
European Search Report in Application No. 20177721.6 dated Nov. 25, 2020 (15 pages).
Hall et al., "Establishment and Maintenance of a Heterochromatin Domain," Science, 297:2232-2237, 2002.
Higuchi et al., "Simultaneous Amplification and Detection of Specific DNA Sequences," Nature Biotechnology, 10:413-417, 1992.
Hite et al., "Factors affecting fidelity of DNA synthesis during PCR amplification of $d(C\text{-}A)_n$ $d(G\text{-}T)_n$ microsatellite repeats," Nucl. Acids. Res., 24(12):2429-2434, 1996.
Hutvagner and Zamore, "A microRNA in a Multiple-Turnover RNAi Enzyme Complex," Science, 297:2056-2060, 2002.
Jenuwein, "An RNA-Guided Pathway for the Epigenome," Science, 297:2215-2218, 2002.
Koster et al., "A strategy for rapid and efficient DNA sequencing by mass spectrometry," Nature Biotechnol., 14:1123-1128, 1996.
Kurn et al., "Novel Isothermal, Linear Nucleic Acid Amplification Systems for Highly Multiplexed Applications," Clinical Chemistry, 51(10):1973-1981, 2005.
Lagos-Quintana et al., "Identification of Novel Genes Coding for Small Expressed RNAs," Science, 294:853-858, 2001.
Lau et al., "An Abundant Class of Tiny RNAs with Probable Regulatory Roles in *Caenorhabditis elegans*," Science, 294:858-862, 2001.
Lee and Ambros, "An Extensive Class of Small RNAs in *Caenorhabditis elegans*," Science, 294:862-864, 2001.
Limbach, "Indirect Mass Spectrometric Methods for Characterizing and Sequencing Oligonucleotides," MassSpectrom. Rev., 15:297-336, 1996.
Lizardi et al., "Exponential Amplification of Recombinant-RNA Hybridization Probes," Nature Biotechnology, 6:1197-1202, 1998.
Llave et al., "Cleavage of Scarecrow-like mRNA Targets Directed by a Class of *Arabidopsis* miRNA," Science, 297:2053-2056, 2002.
McManus et al., "Gene silencing using micro-RNA designed hairpins," RNA Society, 8:842-850, 2002.
Murray, "DNA Sequencing by Mass Spectrometry," J. Mass. Spectrom., 31:1203-1215, 1996.
Notomi, et al., "Loop-mediated isothermal amplification of DNA," Nucleic Acid Research, 28(12):e63 i-vii, 2000.
Office Action in corresponding Canadian Application No. 2,849,193, dated May 4, 2017, pp. 1-2.
Reinhart and Bartel, "Centromere Heterochromatic Repeats," Science, 297:1831, 2002.
Reinhart et al., "MicroRNAs in plants," Gene & Dev., 16:1616-1626, 2002.
Ruvkun, "Glimpses of a Tiny RNA World," Science, 294:797-799, 2001.
Saiki et al., "Primer-Directed Enzymatic Amplification of DNA with a Thermostable DNA Polymerase," Science, 239:487-491, 1988.
Singer et al., "Characterization of PicoGreen Reagent and Development of a Fluorescence-Based Solution assay for Double-Stranded DNA Quantitation," Analytical Biochemistry, 249:228-238, 1997.
Tan et al., "Isothermal DNA Amplification Coupled with DNA Nanosphere-Based Colorimetric Detection," Anal. Chem., 77:7984-7992, 2005.
Tyagi and Kramer, "Molecular Beacons: Probes that Fluoresce upon Hybridization," Nature Biotechnology, 14:303-308, 1996.
Van Ness et al., Isothermal reactions for the amplification of oligonucleotides, PNAS, 100(8):4504-4509, 2003.
Volpe et al., "Regulation of Heterochromatic Silencing and Histone H3 Lysine-9 Methylation by RNAi," Science, 297:1833-1837, 2002.
Wade, "Studies Reveal an Immune System Regulator," New York Times, Apr. 27, 2007.

(56) References Cited

OTHER PUBLICATIONS

Zamore et al., "RNAi: Double-Stranded RNA Directs the ATP-Dependent Cleavage of mRNA at 21 to 23 Nucleotide Intervals," Cell, 101:25-33, 2000.

* cited by examiner

SYSTEM AND APPARATUS FOR REACTIONS INCLUDING A LIQUID TRANSFER DEVICE WITH AN ASYMMETRICAL CROSS-SECTION

CROSS-REFERENCE TO RELATED APPLICATION

This application is a continuation of U.S. patent application Ser. No. 16/057,209, filed Aug. 7, 2018, which is a divisional of U.S. patent application Ser. No. 15/141,190, filed Apr. 28, 2016, now U.S. Pat. No. 10,040,061, issued Aug. 7, 2018, which is a continuation and claims priority to U.S. patent application Ser. No. 13/242,999, filed Sep. 23, 2011, now U.S. Pat. No. 9,352,312, issued May 31, 2016, the entire contents of each of which are incorporated by reference.

TECHNICAL FIELD

This invention relates to systems and apparatuses for liquid transfer and carrying out reactions.

BACKGROUND

Many diagnostic tests that involve biological reactions are required to be performed in laboratories by skilled technicians and/or complex equipment. Such laboratories may be the subject of government regulation. The costs of compliance with such regulations can increase the costs of diagnostic tests to patients and health care payers and exclude such tests from point-of-care facilities. There is a need for systems for performing diagnostic tests involving biological reactions that can be used without extensive training at the point of care.

SUMMARY

The present disclosure provides systems, apparatuses and methods for transfer of liquids and processing of reactions, e.g., in diagnostic tests.

In one aspect, the disclosure features a system that includes a liquid transfer device that includes a housing having a pipette tip and a plunger assembly; and a reaction chamber, wherein the housing of the liquid transfer device is configured to sealably engage with the reaction chamber. In some embodiments, the housing of the liquid transfer device can include a seal component configured to sealably engage with the reaction chamber. In some embodiments, the reaction chamber can include a seal component configured to sealably engage with the liquid transfer device. The systems can further include a fluid reservoir, and the reaction chamber can optionally be configured to lockably engage with the fluid reservoir.

The liquid transfer device can be configured to lockably engage with the reaction chamber, e.g., without dispensing, prior to dispensing, and/or after dispensing a liquid sample.

In some embodiments, the reaction chamber includes one or more components of a biological reaction.

In another aspect, the disclosure features a liquid transfer device that includes a housing having a pipette tip; and a plunger assembly disposed within the housing and the pipette tip, wherein a portion of the plunger assembly is configured to engage a fluid reservoir such that the plunger assembly remains stationary relative to the fluid reservoir and the housing moves relative to the plunger assembly.

In some embodiments, movement of the housing relative to the plunger assembly results in creation of a vacuum within the pipette tip and, optionally, the plunger assembly can be configured to lock in a position resulting in creation of the vacuum. The housing can be configured to move relative to the plunger assembly by pushing the housing down on the fluid reservoir. The device can further be configured to provide an auditory and/or visual indication that the plunger assembly is in a position resulting in the creation of the vacuum.

A system can include the liquid transfer device and one or more of a fluid reservoir and reaction chamber. When a reaction chamber is included, the reaction chamber can be configured to unlock the plunger assembly when the liquid transfer device and the reaction chamber are interfaced.

In another aspect, the disclosure features a liquid transfer device configured to draw a sample from a fluid reservoir by pushing the device against the reservoir and systems that include the liquid transfer device and one or both of a reaction chamber and fluid reservoir.

In the systems described above, two or all three of the liquid transfer device, reaction chamber, and fluid reservoir can have compatible asymmetric cross-sections.

In another aspect, the disclosure features methods that include (i) obtaining a liquid sample from a sample reservoir using a liquid transfer device described above; and (ii) dispensing the liquid sample, e.g., into a reaction chamber comprising one or more components of a reaction.

In another aspect, the disclosure features methods that include (i) obtaining a liquid sample from a fluid reservoir using a liquid transfer device (e.g., a liquid transfer device described above); and (ii) dispensing the liquid sample into a reaction chamber, wherein the liquid transfer device sealably engages with the reaction chamber during or prior to dispensing.

In another aspect, the disclosure features methods that include (i) obtaining a liquid sample from a fluid reservoir using a liquid transfer device (e.g., a liquid transfer device described above); and (ii) dispensing the liquid sample into a reaction chamber, wherein the liquid transfer device lockably engages with the reaction chamber during or prior to dispensing. The methods can further include (iii) interfacing the reaction chamber and the fluid reservoir, such that the reaction chamber lockably engages with the fluid reservoir.

The systems, apparatuses, and methods disclosed herein can provide for simple analysis of unprocessed biological specimens. They can be used with minimal scientific and technical knowledge, and any knowledge required may be obtained through simple instruction. They can be used with minimal and limited experience. The systems and apparatuses allow for prepackaging or premeasuring of reagents, such that no special handling, precautions, or storage conditions are required. The operational steps can be either automatically executed or easily controlled, e.g., through the use of auditory and/or visual indicators of operation of the systems and apparatuses.

The details of one or more embodiments of the invention are set forth in the accompanying drawings and the description below. Other features, objects, and advantages of the invention will be apparent from the description and drawings, and from the claims.

DETAILED DESCRIPTION

This application describes systems, apparatuses, and methods for transfer of liquids and processing of biological reactions (e.g., nucleic acid amplification reactions).

Figure 1:
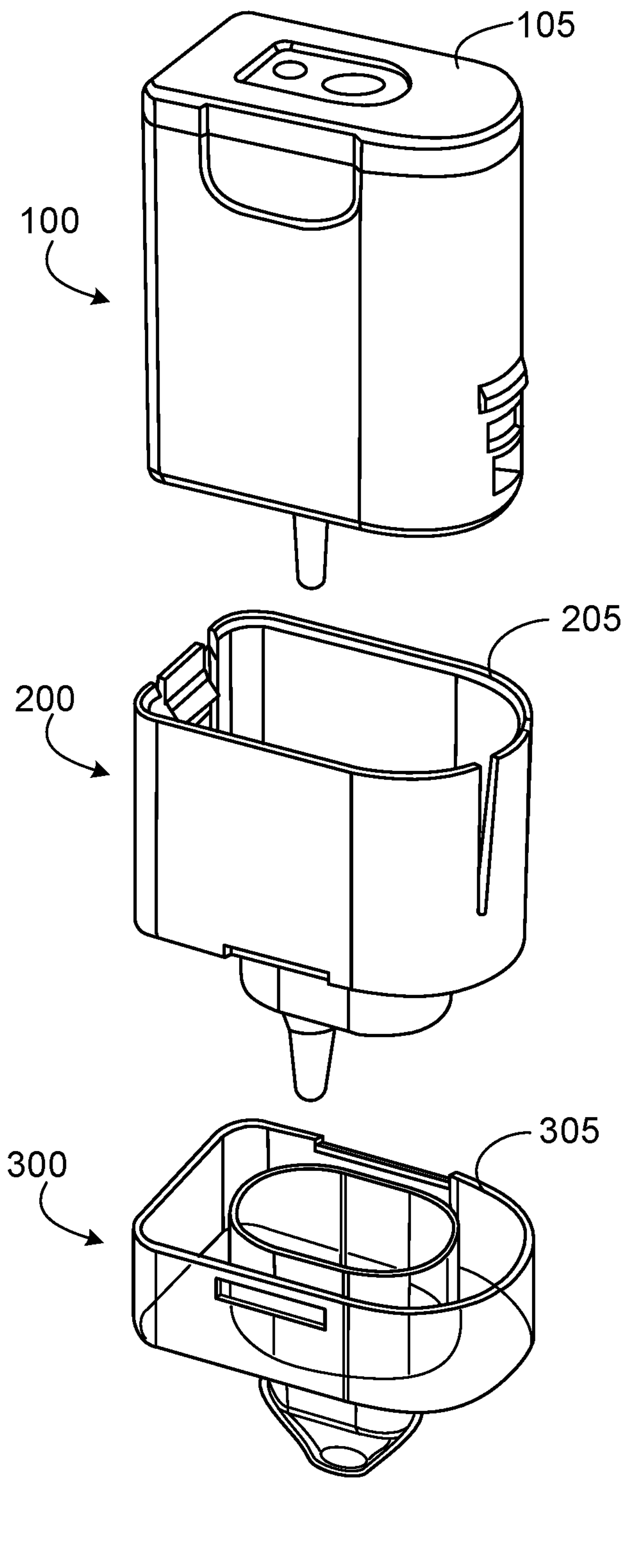
FIG. 1 is an exploded view of an exemplary system as described herein.

Referring to FIG. 1, the system can include three subassemblies: a transfer device 100, amplification chamber 200, and an elution container 300. Each subassembly can have a D-shaped or otherwise asymmetrical cross section 105, 205, 305 that is compatible with the other two subassemblies, such that the subassemblies may only be mated to each other in one orientation.

Figure 2A:
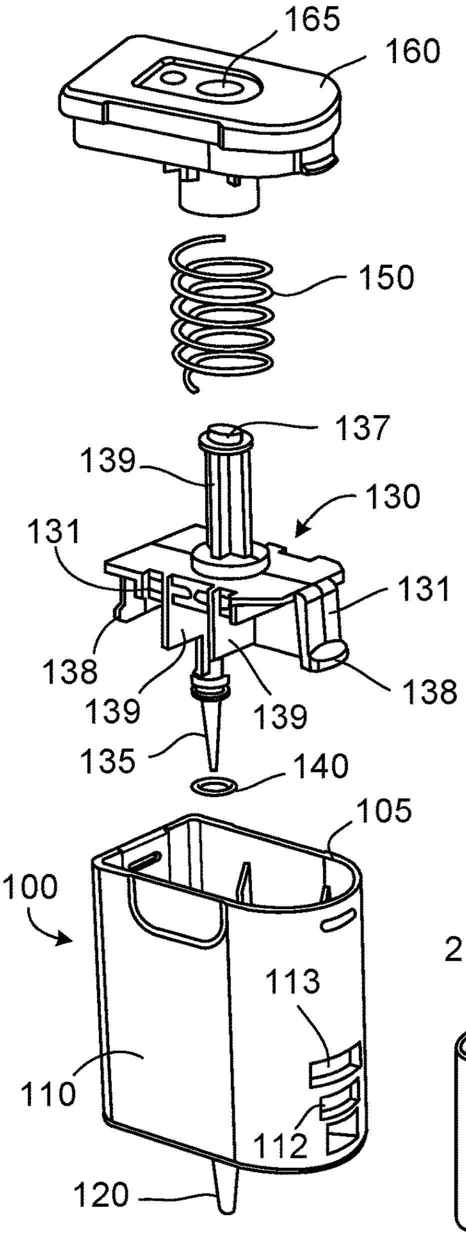
FIGS. 2A-2C are exploded views of system subassemblies.
Figure 2B:
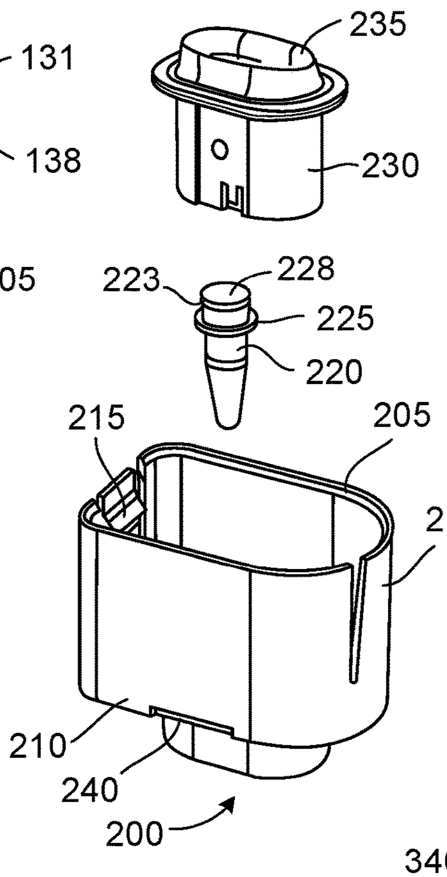
Figure 2C:
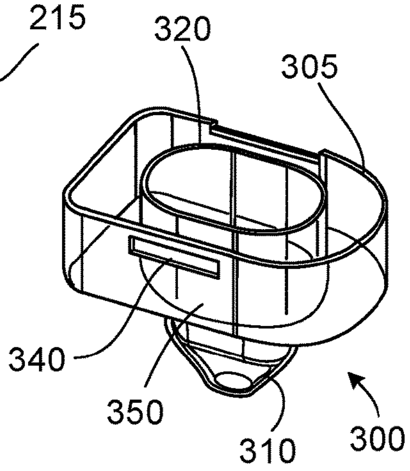

FIGS. 2A-2C, show exploded views of the subassemblies 100, 200, and 300, respectively. In FIG. 2A, the transfer device 100 includes a body 110 having a D-shaped or otherwise asymmetrical cross section 105 and a pipette tip 120. The transfer device also includes a plunger unit 130 having a syringe plunger 135 that seals within the pipette tip 120 using an o-ring 140. The plunger unit also includes flexible arms 131 having tabs 138 that are aligned with two sets of lower 112 and upper 113 slots in the body 110. Ridges within the body 110 align with grooves in the plunger unit 130 to guide the plunger unit 130 up and down within the body 110. When the plunger unit 130 is in the lower position, the tabs 138 insert into the lower slots 112. When the plunger unit 130 is in the upper position, the tabs 138 insert into the upper slots 113. A spring 150 fits over a spring guide 139 of the plunger unit 130, and can be compressed against the cap 160 when the transfer device 100 is assembled. When the plunger unit 130 is in the upper position, an indicator 137 at the top of the spring guide 139 is visible through an indicator window 165 in the cap 160.

In FIG. 2B, the amplification chamber 200 includes a body 210 having a D-shaped or otherwise asymmetrical cross-section 205 that is compatible with the cross-section 105 of the transfer device 100. The amplification chamber body 210 also includes two tabs 215 that insert into either the lower slots 112 or upper slots 113 of the transfer device 100 when the two subassemblies are mated. The reaction chamber 200 also includes a microtube 220 having a retaining ring 225 that holds the microtube 220 within an aperture in the bottom of the amplification chamber body 210. The microtube 220 can also have a seal 228 that covers the mouth 223 of the tube 220. In some embodiments, the microtube 220 is optically permeable to allow monitoring of its contents. The amplification chamber 200 also includes a sealing component 230 that fits within the amplification chamber body 210 and over the microtube 220, holding it in place. The sealing component 230 includes a pliant gasket 235 configured to seal against the pipette housing 180 when the two subassemblies are mated (see FIGS. 6A-6D). Two side tabs 240 are present near the bottom of the body 210 of the amplification chamber 200.

In FIG. 2C, the elution container 300 has a D-shaped or otherwise asymmetrical cross-section 305 that is compatible with the cross-section 105 of the transfer device 100. The elution container 300 includes an elution buffer reservoir 310 and a guide ring 320 compatible with a pipette housing 180 of the transfer device 100. A seal can cover the mouth of the buffer reservoir 310 or guide ring 320. Two notches 340 are present on the side walls 350 of the elution chamber 300, into which insert the side tabs 240 of the amplification chamber 200 when the two subassemblies are mated.

Figure 2D:
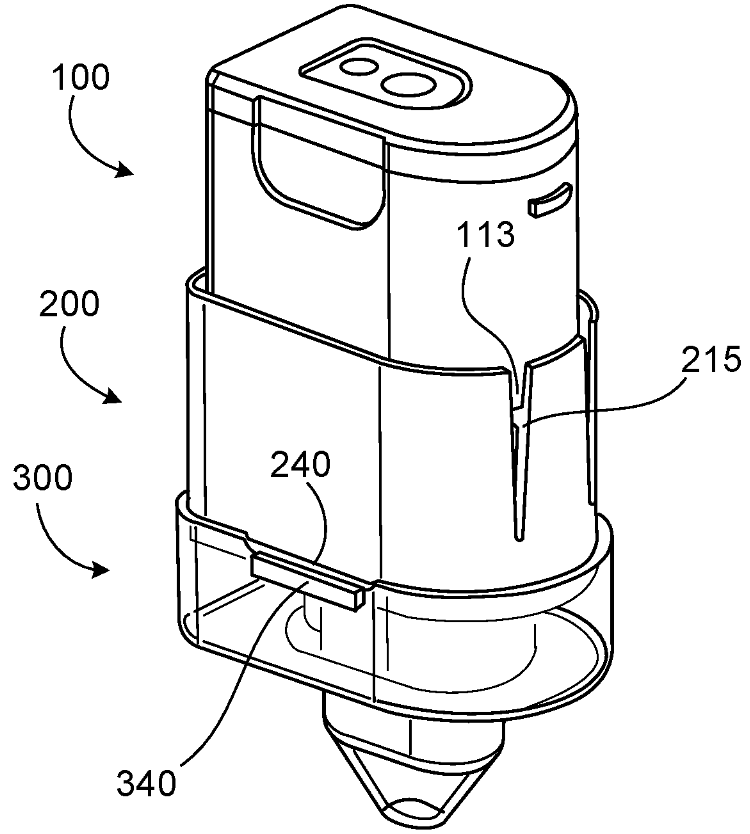
FIG. 2D is a view of the system mated and joined.

FIG. 2D shows the three subassemblies of the system mated and joined for disposal. The transfer device 100 locks into the amplification chamber 200 by insertion of the amplification chamber tabs 215 into the upper slots 113 of the transfer device 100. Similarly, the amplification chamber 200 locks into the elution chamber 300 by insertion of the side tabs 240 of the amplification chamber 200 into the notches 340 of the elution chamber 300. In this configuration, the patient sample and any amplified nucleic acids are sealed within the system to prevent contamination. Approximate dimensions of the joined system are shown.

Figures 3A, 3B, 3C, 3D:
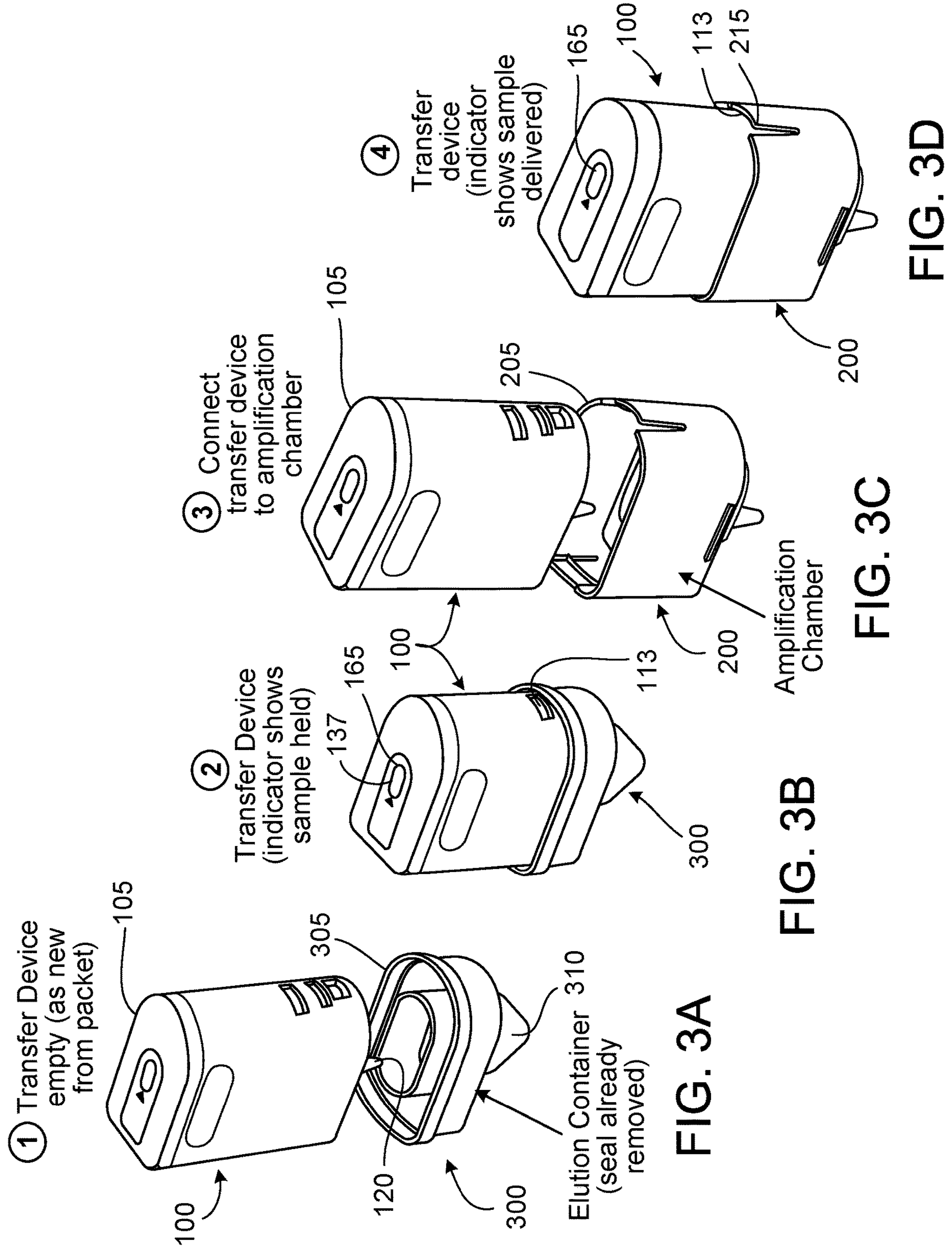
FIGS. 3A-3D depict the system in use.

FIGS. 3A-3D show an overview of the system in operation. In FIG. 3A, the transfer device 100 is positioned above the elution chamber 300 with their D-shaped cross-sections 105 and 305 aligned. In FIG. 3B, the transfer device 100 is pushed down on the elution chamber 300, such that the pipette tip 120 enters the buffer reservoir 310 and the plunger unit 130 remains stationary relative to the body 110 due to contact with a guide ring on the buffer reservoir 310. This results in the plunger unit 130 in the upper position, compressing the spring 150 such that the indicator 137 shows through the indicator window 165. The presence of the indicator 137 in the indicator window 165 and an audible click as the tabs 138 insert into the upper slots 113 provide auditory and visual feedback that the transfer device has been manipulated properly such that the pipette tip 120 is able to withdraw a portion of the sample from the buffer reservoir 310. In FIG. 3C, the transfer device 100 has been removed from the elution chamber 300 and positioned above the amplification chamber 200 with their D-shaped cross-sections 105 and 205 aligned. In FIG. 3D, the transfer device 100 is pushed onto the amplification chamber 200. The two tabs 215 of the amplification chamber 200 insert into the upper slots 113 of the transfer device 100, displacing the tabs 138 and allowing the compressed spring 150 to relax and the plunger unit 130 to return to the lower position. The indicator 137 is no longer visible in the indicator window 165, signaling that the contents of the pipette tip 120 have been emptied into the microtube 220. The transfer device 100 is locked into the amplification chamber 200 by insertion of the amplification chamber tabs 215 into the upper slots 113 of the transfer device 100.

Figure 4:
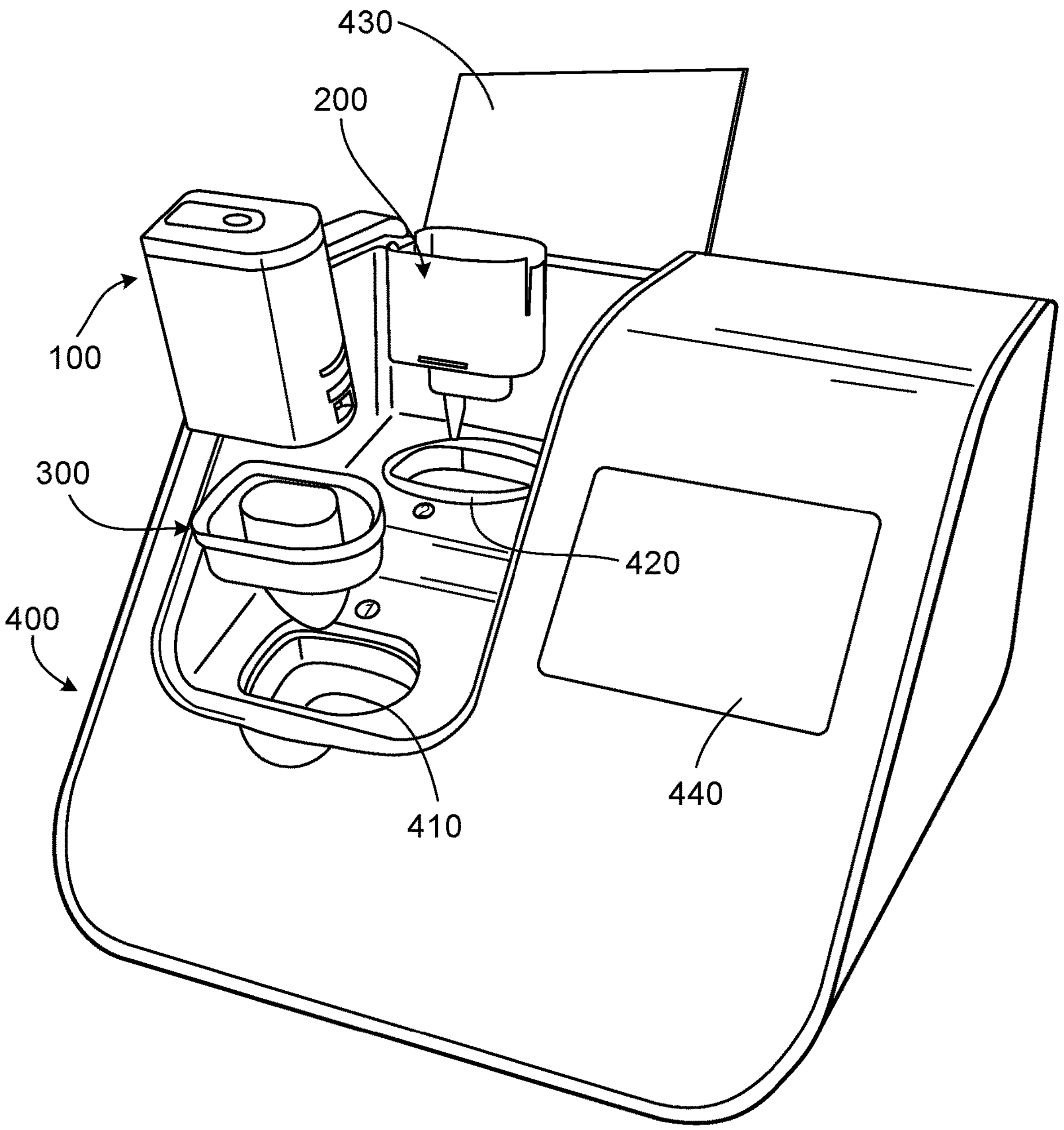
FIG. 4 depicts the system in the context of an exemplary detection device.

FIG. 4 shows the system with an exemplary detection device 400. The detection device 400 includes a first station 410 adapted to securely hold the elution chamber 300 and a second station 420 adapted to securely hold the amplification chamber 200. When in use, the transfer device 100 is moved between the elution chamber 300 at the first station 410 and the amplification chamber 200 at the second station 420. The detection device includes a lid 430 that can be closed when the detection device 400 is in operation or for storage. A touchscreen user interface 440 is present for inputting data and displaying information regarding the assay. The second station 420 can include a bar code reader or similar device to automatically detect a bar code or similar code present on the amplification chamber 200. The first 410 and second 420 stations can be adapted to heat or cool the contents of the elution chamber 300 and reaction chamber 200. The second station 420 can also be adapted to provide optical, fluorescence, or other monitoring and/or agitation of the microtube 220.

Figure 5A:
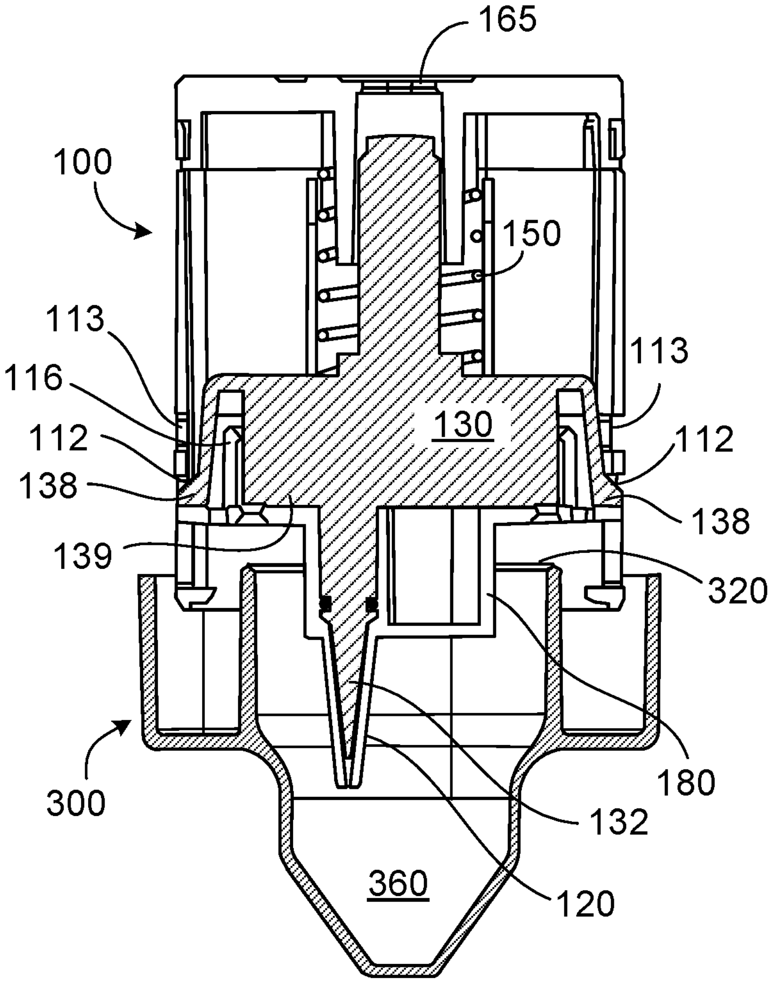
FIGS. 5A-5C depict the system in cross-section during sample collection.
Figure 5B:
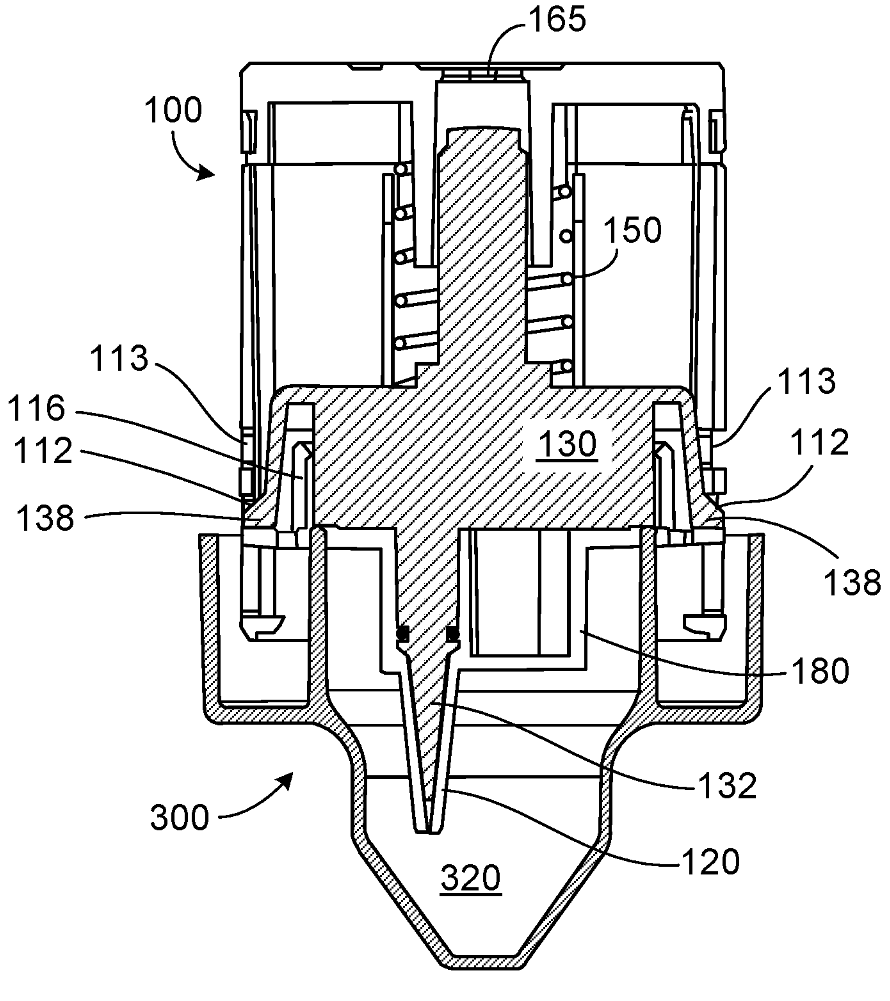
Figure 5C:
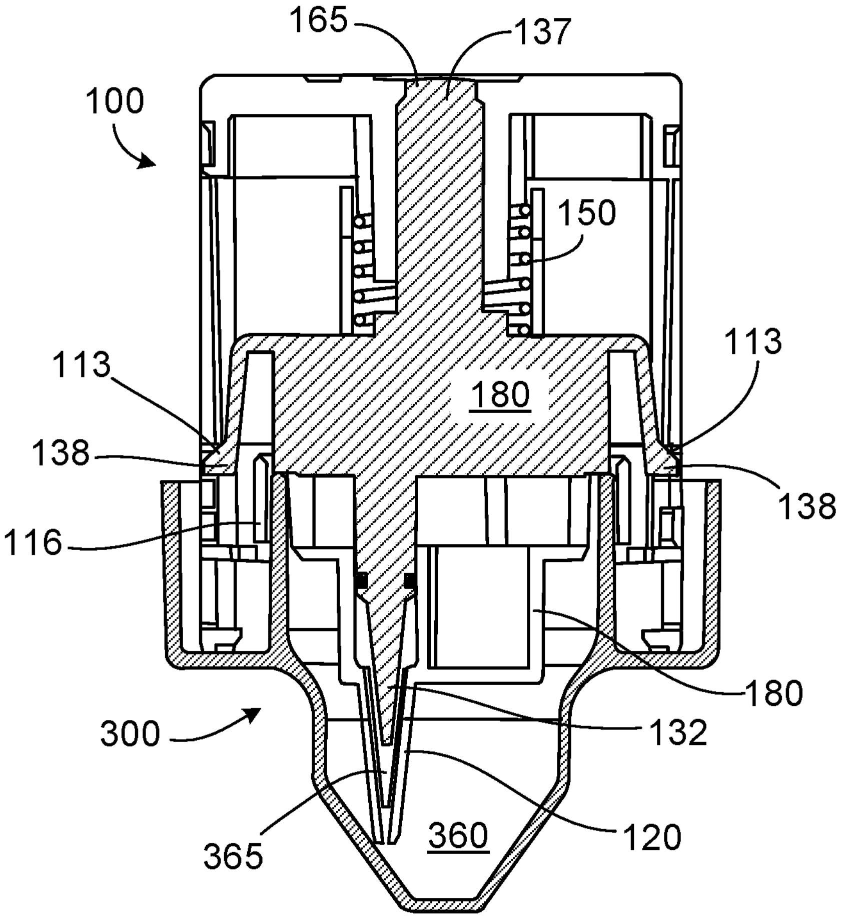

FIGS. 5A-5C show the system in cross-section during sample collection. In FIG. 5A, the transfer device 100 is placed above the elution chamber 300 such that their cross sections 105, 305 are aligned. The plunger unit 130 is in the lower position and the tabs 138 are in the lower slots 112. In FIG. 5B, the transfer device 100 is lowered until one or more flanges 139 on the lower surface of the plunger unit 130 contact the guide ring 320, and the pipette tip 120 and plunger tip 132 are inserted into the liquid sample 360. The liquid sample 360 can be a patient or other sample or include a patient or other sample dissolved or suspended in a buffer. In FIG. 5C, the transfer device 100 is pushed down by the user into the elution chamber 300. The plunger unit 130 remains stationary through the contact of the one or more flanges 139 against the guide ring 320, while the transfer device body 110 is lowered relative to the plunger unit 130 and elution chamber 300. Simultaneously, a guide channel 116 in the transfer device is pushed downward relative to the guide ring 320. The downward motion of the transfer device body 110 causes the pipette tip 120 to move downward relative to the plunger tip 132 and draw a liquid sample portion 365 into the pipette tip 120. The downward motion of the transfer device body 110 relative to the plunger unit 130 also compresses the spring 150, moves the tabs 138 from the lower slots 112 to the upper slots 113, and causes the indicator 137 to be visible through the indicator window 165. The transfer device 100 with the liquid sample portion 365 can now be lifted off of the elution chamber 300 and is ready for transfer and dispensing.

Figure 6B:
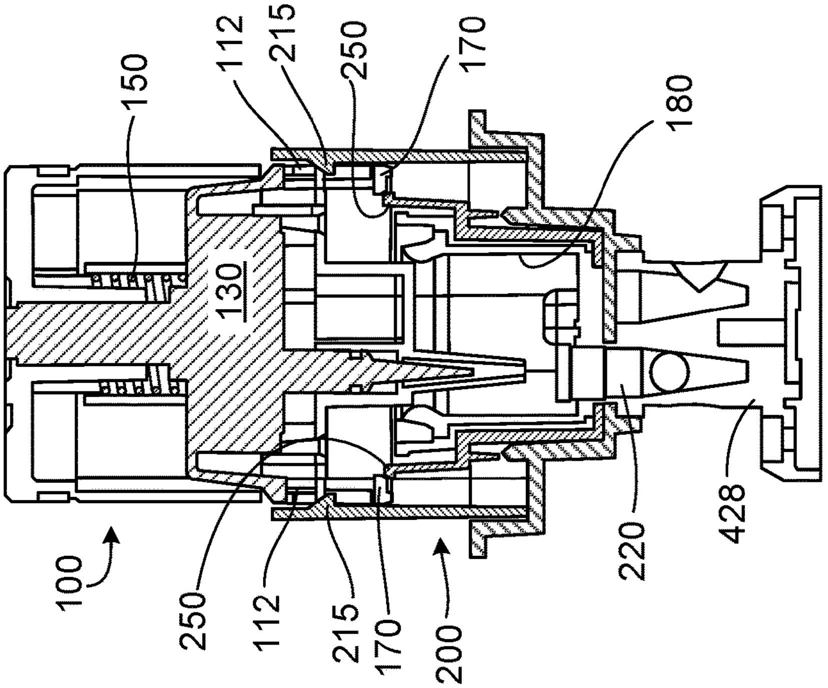
FIGS. 6A-6D depict the system in cross-section during sample dispensing.
Figure 6A:
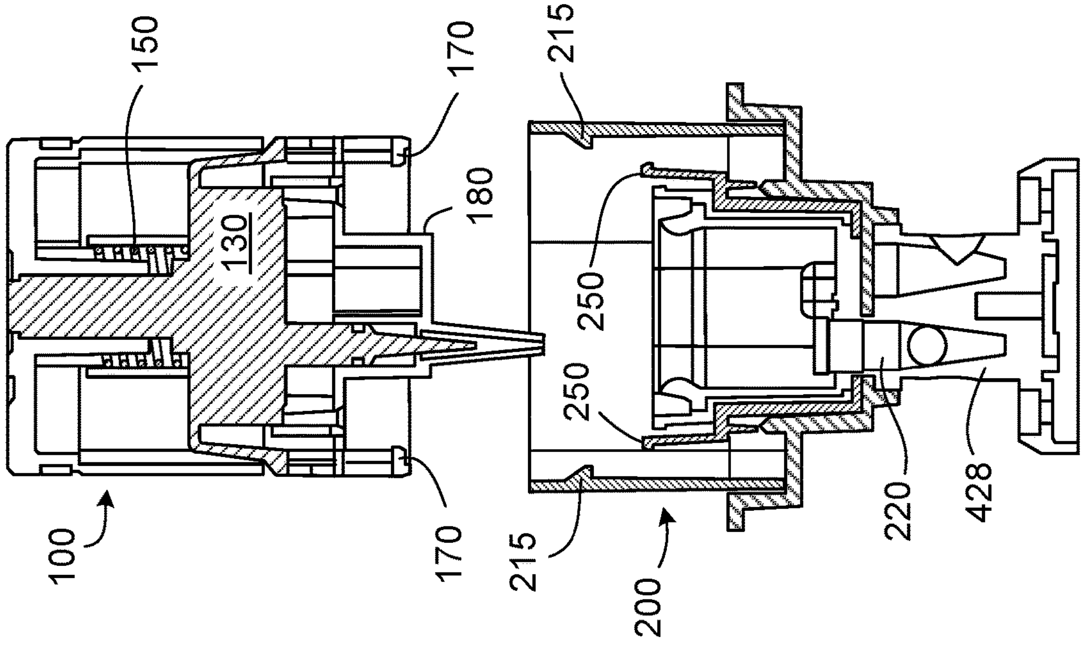
Figure 6D:
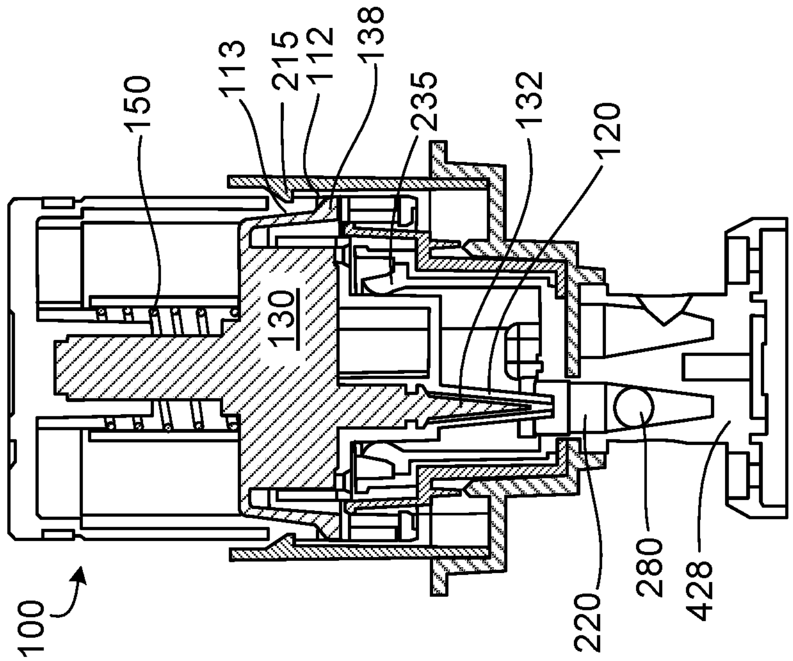
Figure 6C:
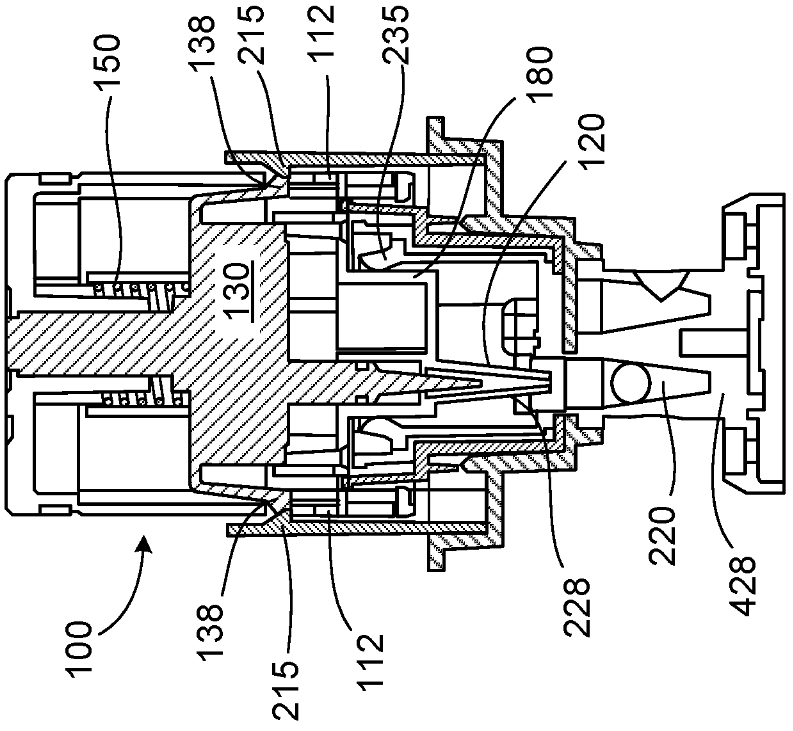

FIGS. 6A-6D show the system in cross-section during sample dispensing. In FIG. 6A, the transfer device 100 is placed above the amplification chamber 200 such that their cross sections 105, 205 are aligned. The amplification chamber 200 is held within the second station 420 of the detection device 400 with the microtube 220 seated within a tube holder 428. In FIG. 6B, the transfer device 100 is lowered until two inner tabs 250 within the amplification chamber 200 engage two ridges 170 in the lower sides of the transfer device body 110, the tabs 215 insert into the lower slots 112 of the transfer device 100, and the gasket 235 engages the pipette housing 180. This prevents the transfer device 100 from being easily removed from the amplification chamber 200 once dispensing has been started and prevents release of the sample. In FIG. 6C, the transfer device 100 is further lowered onto the amplification chamber 200, such that the amplification chamber tabs 215 insert into the upper slots 113 of the transfer device and displace the plunger unit tabs 138. Simultaneously, the pipette tip 120 pierces the seal 228 on the microtube 220. In FIG. 6D, the plunger unit 130, no longer held in the upper position, moves to the lower position as the spring 150 expands. This causes the plunger tip 132 to move downward within the pipette tip 120 and dispense the liquid sample portion 365 into the microtube 220. The liquid sample portion 365 rehydrates a dried reagent pellet 280 in the microtube 220, initiating reaction (e.g., an amplification reaction). The transfer device 100 is locked in place on the amplification chamber 200 by the tabs 215 inserted into the upper slots 113, and any product of the amplification reaction is sealed within the unit by the gasket 235.

Figure 7A:
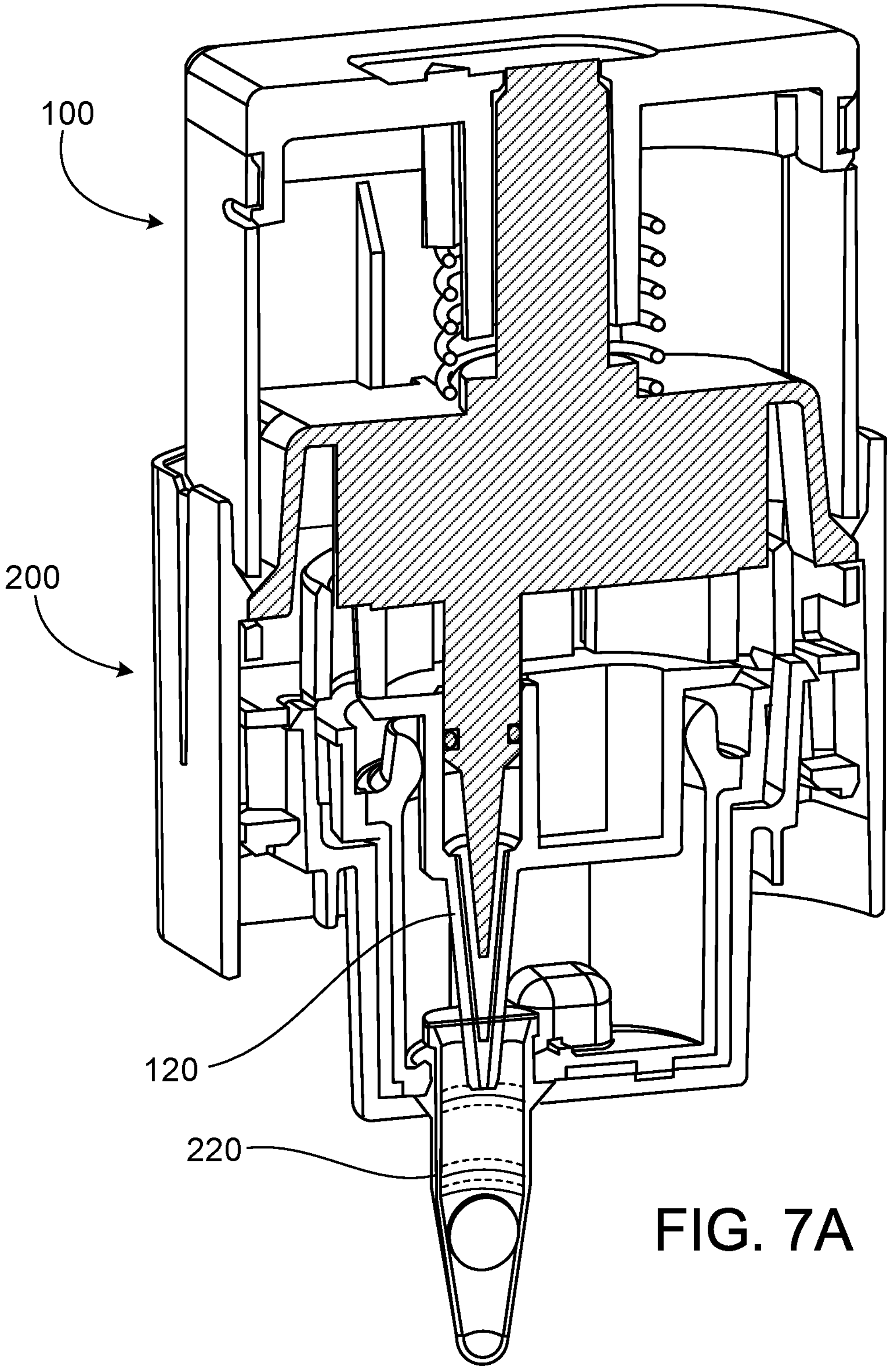
FIGS. 7A-7B depict single (7A) and double (7B) variants of the system.
Figure 7B:
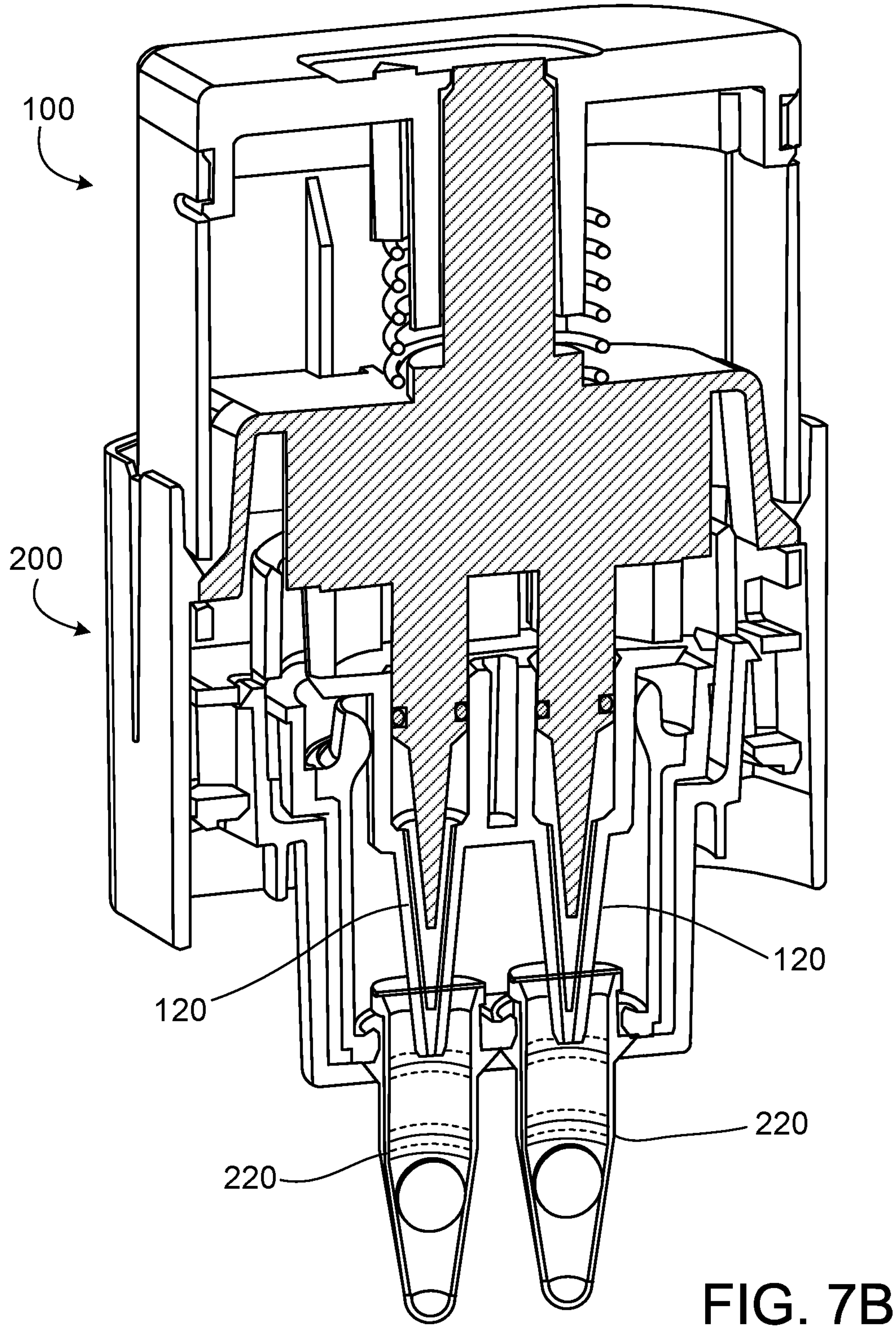

FIGS. 7A and 7B are three-quarter cross sections showing the system configured for one or two microtubes 220. FIG. 7A shows the transfer device 100 and amplification chamber 200 as described above with one pipette tip 120 and one microtube 220. FIG. 7B shows the transfer device 100 and amplification chamber 200 with two pipette tips 120 and two microtubes 220. Using the device in FIG. 7B, parallel reactions (e.g., amplification reactions) can be performed on two portions of one sample.

The systems and apparatuses disclosed herein can be used to perform reactions, e.g., utilizing biological components. In some embodiments, the reactions involve production of nucleic acids, such as in nucleic acid amplification reactions. Exemplary nucleic acid amplification reactions suitable for use with the disclosed apparatuses and systems include isothermal nucleic acid amplification reactions, e.g., strand displacement amplification, nicking and extension amplification reaction (NEAR) (see, e.g., US 2009/0081670), and recombinase polymerase amplification (RPA) (see, e.g., U.S. Pat. Nos. 7,270,981; 7,666,598). In some embodiments, a microtube can contain one or more reagents or biological components, e.g., in dried form (see, e.g., WO 2010/141940), for carrying out a reaction.

The systems and apparatuses disclosed herein can be used to process various samples in reactions, e.g., utilizing biological components. In some embodiments, the samples can include biological samples, patient samples, veterinary samples, or environmental samples. The reaction can be used to detect or monitor the existence or quantity of a specific target in the sample. In some embodiments, a portion of the sample is transferred using a transfer device as disclosed herein.

In some embodiments, a liquid transfer device or pipette tip disclosed herein can be configured to collect and dispense a volume between 1 μl and 5 ml (e.g., between any two of 1 μl, 2 μl, 5 μl, 10 μl, 20 μl, 50 μl, 100 μl, 200 μl, 500 μl, 1 ml, 2 ml, and 5 ml).

The disclosure also features articles of manufacture (e.g., kits) that include one or more systems or apparatuses disclosed herein and one or more reagents for carrying out a reaction (e.g., a nucleic acid amplification reaction).

A number of embodiments of the invention have been described. Nevertheless, it will be understood that various modifications may be made without departing from the spirit and scope of the invention. For example, a transfer device as described herein can include three or more pipette tips. Accordingly, other embodiments are within the scope of the following claims.

What is claimed is:

1. A system comprising:

a liquid transfer device (100) comprising a housing (110) having a plurality of pipette tips (120) extending from a bottom surface of the housing (110), and a plunger assembly (130) disposed within the housing (110); and a fluid reservoir (300) comprising a housing having an opening, wherein a bottom periphery of the housing (110) of the liquid transfer device (100) comprises an asymmetrical cross-section (105) that is compatible with a cross-section of the opening of the housing of the fluid reservoir (300), such that when the liquid transfer device (100) is mated with the fluid reservoir (300), the bottom periphery of the housing (110) sealably engages with the opening of the housing of the fluid reservoir (300), and the plurality of pipette tips (120) is disposed within the fluid reservoir (300).

2. The system of claim 1, wherein said plunger assembly (130) comprises a plurality of syringe plungers (135), each syringe plunger (135) operably connected to a corresponding pipette tip (120) of the plurality of pipette tips (120).

3. The system of claim 2, wherein each syringe plunger (135) of said plurality of syringe plungers (135) seals within a pipette tip (120) of the plurality of pipette tips (120).

4. The system of claim 2, wherein each syringe plunger (135) of said plurality of syringe plungers (135) comprises an o-ring (140).

5. The system of claim 2, wherein said plunger assembly (130) comprises two syringe plungers (135).

6. The system of claim 1, wherein said plurality of pipette tips (120) comprises two pipette tips (120).

7. The system of claim 1, further comprising a reaction chamber (200) comprising a housing (210), wherein the asymmetrical cross-section (105) of the bottom periphery of the housing (110) of the liquid transfer device (100) is compatible with a cross-section (205) of an opening of the housing (210) of the reaction chamber (200) and, when the liquid transfer device (100) is mated with the reaction chamber (200), the bottom periphery of the housing (110) of the liquid transfer device (100) lockably engages with the opening of the housing (210) of the reaction chamber (200).

8. The system of claim 7, wherein cross-section of the reaction chamber (200) is compatible with the cross-section of the opening of the housing of the fluid reservoir (300) and, when the reaction chamber (200) is mated with the fluid reservoir (300), the housing (210) of the reaction chamber (200) lockably engages with the opening of the housing of the fluid reservoir (300).

9. The system of claim 7, wherein the bottom periphery of the housing (110) of the liquid transfer device (100) comprises a gasket configured to sealably engage with the opening of the housing (210) of the reaction chamber (200) and/or the opening of the housing (210) of the reaction chamber (200) comprises a gasket (235) configured to sealably engage with the bottom periphery of the housing (110) of the liquid transfer device (100), the gasket (235) fitting within the housing (210) of the reaction chamber (200).

10. The system of claim 7, wherein the liquid transfer device (100) further comprises a pair of slots and the reaction chamber further comprises a pair of tabs, wherein the slots are configured to lockably engage with the pair of tabs without dispensing and/or after dispensing.

11. The system of claim 7, wherein the reaction chamber (200) locks into the fluid reservoir (300) via insertion of one or more side tabs (240) on the reaction chamber (200) into one or more corresponding notches (340) on the fluid reservoir (300).

12. The system of claim 7, wherein the reaction chamber (200) locks into the fluid reservoir (300) when mated to form an irreversible seal.

13. The system of claim 1, wherein, when the liquid transfer device (100) is mated with the fluid reservoir (300), the plunger assembly (130) is configured to remain stationary relative to the fluid reservoir (300) and the housing (110) of the liquid transfer device (100) is configured to move relative to the plunger assembly (130), due to one or more flanges (139) disposed on the plunger assembly that contact a guide ring (320) on the fluid reservoir (300) to remain stationary.

14. The system of claim 1, wherein movement of the housing (110) of the liquid transfer device (100) relative to the plunger assembly (130) results in creation of a vacuum within the plurality of pipette tips (120).

15. The system of claim 1, wherein the housing (110) of the liquid transfer device (100) is configured to move relative to the plunger assembly (130) when the housing (110) is advanced toward the fluid reservoir (300).

16. The system of claim 1, wherein the housing of the fluid reservoir (300) comprises an outer wall (350) and an inner wall, wherein the inner wall is spaced apart from and positioned within the outer wall (350).

17. The system of claim 16, wherein the liquid transfer device (100) and the fluid reservoir (300) sealably engage when mated with the bottom periphery of the housing (110) of the liquid transfer device (100) positioned between the inner wall and the outer wall (350) of the fluid reservoir (300).

18. The system of claim 1, wherein the system contains a biological material, and the biological material is sealed within at least one of: the fluid reservoir (300) or the liquid transfer device (100).

19. A system comprising:

a liquid transfer device (100) comprising:

- a housing (110) having a first pipette tip (120) extending from a bottom surface of the housing (110) and a second pipette tip (120) extending from the bottom surface of the housing proximate the first pipette tip (120); and
- a plunger assembly (130) disposed within the housing (110);

a fluid reservoir (300) comprising a housing having an opening; and a reaction chamber (200) comprising a housing having an opening, wherein a bottom periphery of the housing (110) of the liquid transfer device (100) comprises an asymmetrical cross-section (105) that is compatible with a cross-section (305) of the opening of the housing of the fluid reservoir (300) such that when the liquid transfer device (100) is mated with the fluid reservoir (300), the bottom periphery of the housing (110) sealably engages with the opening of the housing of the fluid reservoir (300);

wherein the asymmetrical cross-section (105) of the bottom periphery of the housing (110) of the liquid transfer device (100) is compatible with a cross-section (205) of the opening of the housing of the reaction chamber (200) and, when the liquid transfer device (100) is mated with the reaction chamber (200), the bottom periphery of the housing (110) lockably engages with the opening of the housing of the reaction chamber (200); and wherein the opening of the housing of the reaction chamber (200) has an asymmetrical cross-section (205) that is compatible with the cross-section (305) of the opening of the housing of the fluid reservoir (300) and, when the reaction chamber (200) is mated with the fluid reservoir (300), the opening of the housing of the reaction chamber (200) lockably engages with the opening of the housing of the fluid reservoir (300).

* * * * *